(12) United States Patent
Yamada et al.

(10) Patent No.: US 12,533,103 B2
(45) Date of Patent: Jan. 27, 2026

(54) SOUND DETECTION SYSTEM AND INFORMATION PROCESSING DEVICE

(71) Applicant: TERUMO KABUSHIKI KAISHA, Tokyo (JP)

(72) Inventors: Kazuhiro Yamada, Hadano (JP); Yoshiyuki Habu, Hadano (JP)

(73) Assignee: TERUMO KABUSHIKI KAISHA, Tokyo (JP)

(*) Notice: Subject to any disclaimer, the term of this patent is extended or adjusted under 35 U.S.C. 154(b) by 252 days.

(21) Appl. No.: 17/848,973

(22) Filed: Jun. 24, 2022

(65) Prior Publication Data

US 2022/0354450 A1 Nov. 10, 2022

Related U.S. Application Data

(63) Continuation of application No. PCT/JP2020/045125, filed on Dec. 3, 2020.

(30) Foreign Application Priority Data

Dec. 27, 2019 (JP) ................................. 2019-239343

(51) Int. Cl.
*A61B 7/02* (2006.01)
(52) U.S. Cl.
CPC ...... *A61B 7/026* (2013.01); *A61B 2562/0204* (2013.01); *A61B 2562/046* (2013.01)
(58) Field of Classification Search
CPC .. H04R 1/406; H04R 3/005; H04R 2201/401; A61B 7/026; A61B 2562/0204; A61B 2562/046; A61B 7/04
See application file for complete search history.

(56) References Cited

U.S. PATENT DOCUMENTS 10,820,857 B2 * 11/2020 Nasry ................. A61B 5/6805
11,045,144 B2 * 6/2021 Zhou .................. A61B 5/7225
(Continued)

FOREIGN PATENT DOCUMENTS

CN 108074583 A 5/2018
CN 108141663 A 6/2018
(Continued)

OTHER PUBLICATIONS

International Search Report (PCT/ISA/210) with translation and Written Opinion (PCT/ISA/237) mailed on Feb. 22, 2021, by the Japanese Patent Office as the International Searching Authority for International Application No. PCT/JP2020/045125. (10 pages).
(Continued)

*Primary Examiner* — Forrest M Phillips
*Assistant Examiner* — Joseph James Peter Illicete
(74) *Attorney, Agent, or Firm* — Buchanan Ingersoll & Rooney PC (57) ABSTRACT

A sound detection system includes a plurality of microphones each configured to detect a sound inside a living body and output a sound signal generated based on the detected sound; and an information processing device that includes an acquisition unit configured to acquire the sound signal from each of the plurality of microphones, a control unit, and an output unit, the control unit specifies a first position that is a position of a prescribed living body site based on the sound signals acquired by the acquisition unit, estimates a second position that is in a prescribed relative positional relation with the first position, and controls directivities of the plurality of microphones to increase a sensitivity with respect to the second position, and the output unit outputs information generated based on the sound signals acquired by the acquisition unit in which the directivities of the plurality of microphones are controlled.

20 Claims, 8 Drawing Sheets

(56) References Cited

U.S. PATENT DOCUMENTS

| | | | |
|---|---|---|---|
| 11,678,844 B2* | 6/2023 | Nasry | A61B 7/008 |
| | | | 600/301 |
| 11,717,253 B2* | 8/2023 | Jones | A61B 7/026 |
| | | | 600/528 |
| 2007/0055151 A1 | 3/2007 | Shertukde et al. | |
| 2011/0009759 A1 | 1/2011 | Rajamani et al. | |
| 2011/0137209 A1* | 6/2011 | Lahiji et al. | A61B 5/6805 |
| 2012/0209132 A1 | 8/2012 | Jones et al. | |
| 2017/0209115 A1 | 7/2017 | Lönnroth et al. | |
| 2018/0137876 A1 | 5/2018 | Sun et al. | |
| 2018/0295443 A1 | 10/2018 | Takada et al. | |
| 2019/0125196 A1 | 5/2019 | Kline et al. | |

FOREIGN PATENT DOCUMENTS

| | | | |
|---|---|---|---|
| JP | 2008528112 A | 7/2008 | |
| JP | 2009188617 A | 8/2009 | |
| JP | 2011514199 A | 5/2011 | |
| JP | 2015130904 A | 7/2015 | |
| JP | 2018044774 A | 3/2018 | |
| JP | 2019010436 A | 1/2019 | |
| JP | 2019521756 A | 8/2019 | |
| WO | 2011/056856 A1 | 5/2011 | |

OTHER PUBLICATIONS

Extended European Search Report issued on Dec. 22, 2022, in corresponding European Patent Application No. 20907173.7. (5 pages).

Office Action/Search Report (The First Office Action) issued on Dec. 20, 2024, in corresponding Chinese Patent Application No. 202080090349.2 and English translation of the Office Action. (9 pages).

* cited by examiner

SOUND DETECTION SYSTEM AND INFORMATION PROCESSING DEVICE

CROSS-REFERENCES TO RELATED APPLICATIONS

This application is a continuation of International Application No. PCT/JP2020/045125 filed on Dec. 3, 2020, which claims priority to Japanese Patent Application No. 2019-239343 filed on Dec. 27, 2019, the entire content of both of which is incorporated herein by reference.

TECHNOLOGICAL FIELD

The present disclosure relates to a sound detection system and an information processing device.

BACKGROUND DISCUSSION

In the related art, in order to diagnose a state of a heart of a patient, heart sounds are auscultated by a stethoscope or the like.

The heart sounds include a sound referred to as an I sound and a sound referred to as an II sound. The I sound is a sound that can be heard when a mitral valve and a tricuspid valve close. The II sound is a sound that can be heard when a pulmonary valve and an aortic valve close.

For example, Japanese Patent Application Publication No. 2019-10436 A discloses a technique in which heart sounds are detected using a plurality of sensors, a specific sound such as a sound generated when a mitral valve closes is selected from the detected heart sounds, and the selected specific sound is amplified.

When there is a stenosis site in a coronary artery, a stenosis sound is generated immediately after an II sound. Detecting the stenosis sound in the coronary artery is to detect a sign of a coronary artery disease such as angina pectoris and myocardial infarction and is useful.

However, the stenosis sound in the coronary artery is a relatively weak sound, such that the stenosis sound can be difficult to detect.

SUMMARY

A sound detection system and an information processing device are disclosed, which are capable of increasing a detection sensitivity with respect to a relatively weak sound inside a living body.

A sound detection system according to a first aspect of the present disclosure includes a plurality of microphones each configured to detect a sound inside a living body and output a sound signal generated based on the detected sound; and an information processing device, the information processing device includes an acquisition unit configured to acquire the sound signals from the plurality of microphones, a control unit, and an output unit, the control unit specifies a first position that is a position of a prescribed living body site based on the sound signals acquired by the acquisition unit, estimates a second position that is in a prescribed relative positional relation with the first position, and controls directivities of the plurality of microphones to increase a sensitivity with respect to the second position, and the output unit outputs information generated based on the sound signals acquired by the acquisition unit in a state in which the directivities of the plurality of microphones are controlled to increase the sensitivity with respect to the second position.

In the sound detection system according to the above embodiment of the present disclosure, the information processing device further includes a storage unit configured to store information on the prescribed relative positional relation between the first position and the second position.

In the sound detection system according to the above embodiment of the present disclosure, the control unit specifies the first position based on an amplitude and a phase of the sound signal, which is generated based on a sound whose sound source is the prescribed living body site and acquired from each of the microphones, and relative positions of the plurality of microphones.

In the sound detection system according to the above embodiment of the present disclosure, the control unit controls the directivities of the plurality of microphones by adjusting a delay amount of the sound signal acquired from each of the microphones and combining the adjusted delay amounts.

In the sound detection system according to the above embodiment of the present disclosure, the control unit determines an intensity of a sound signal acquired from the second position, and causes the output unit to output an index generated based on the determination result.

In the sound detection system according to the above embodiment of the present disclosure, the control unit controls the directivities of at least two microphones among the plurality of microphones to increase the sensitivity with respect to the second position.

In the sound detection system according to the above embodiment of the present disclosure, the control unit causes the output unit to output, when the first position is away from positions of the plurality of microphones by a prescribed distance or farther, notification information for recommending movement of the positions of the plurality of microphones.

In the sound detection system according to the above embodiment of the present disclosure, relative positions of the plurality of microphones are fixed.

In the sound detection system according to the above embodiment of the present disclosure, relative positions of the plurality of microphones are variable, the sound detection system further includes a relative position measurement unit configured to measure the relative position of each of the plurality of microphones, and the control unit calculates the relative positions of the plurality of microphones based on the relative position of each of the plurality of microphones measured by the relative position measurement unit.

The sound detection system according to the above embodiment of the present disclosure further includes an imaging apparatus, in the sound detection system, relative positions of the plurality of microphones are variable, and the control unit calculates the relative positions of the plurality of microphones based on an image of the plurality of microphones captured by the imaging apparatus.

An information processing device according to a second aspect of the present disclosure includes a plurality of microphones each configured to detect a sound inside a living body and output a sound signal generated based on the detected sound; an acquisition unit configured to acquire the sound signals from the plurality of microphones, a control unit, and an output unit, the control unit specifies a first position that is a position of a prescribed living body site based on the sound signals acquired by the acquisition unit, estimates a second position that is in a prescribed relative positional relation with the first position, and controls directivities of the plurality of microphones to increase a sensitivity with respect to the second position, and the output unit outputs information generated based on the sound signals acquired by the acquisition unit in a state in which the directivities of the plurality of microphones are controlled to increase the sensitivity with respect to the second position.

A method for detection of sound inside a living body according to another aspect, the method includes affixing a plurality of microphones to the living body, each of the plurality of microphones configured to detect a sound inside the living body and output a sound signal generated based on the detected sound; acquiring the sound signals from the plurality of microphones; specifying a first position that is a position of a prescribed living body site based on the acquired sound signals; estimating a second position that is in a prescribed relative positional relation with the first position; controlling directivities of the plurality of microphones to increase a sensitivity with respect to the second position; and outputting information generated based on the acquired sound signals in a state in which the directivities of the plurality of microphones are controlled to increase the sensitivity with respect to the second position to an output unit.

According to the sound detection system and the information processing device of the present disclosure, a detection sensitivity with respect to a relatively weak sound inside a living body can be increased.

DETAILED DESCRIPTION

Set forth below with reference to the accompanying drawings is a detailed description of embodiments of a sound detection system and an information processing device. Note that since embodiments described below are preferred specific examples of the present disclosure, although various technically preferable limitations are given, the scope of the present disclosure is not limited to the embodiments unless otherwise specified in the following descriptions. Hereinafter, embodiments of the present disclosure will be described with reference to drawings. In the drawings, common components are denoted by the same reference numerals.

First Embodiment

Figure 1:
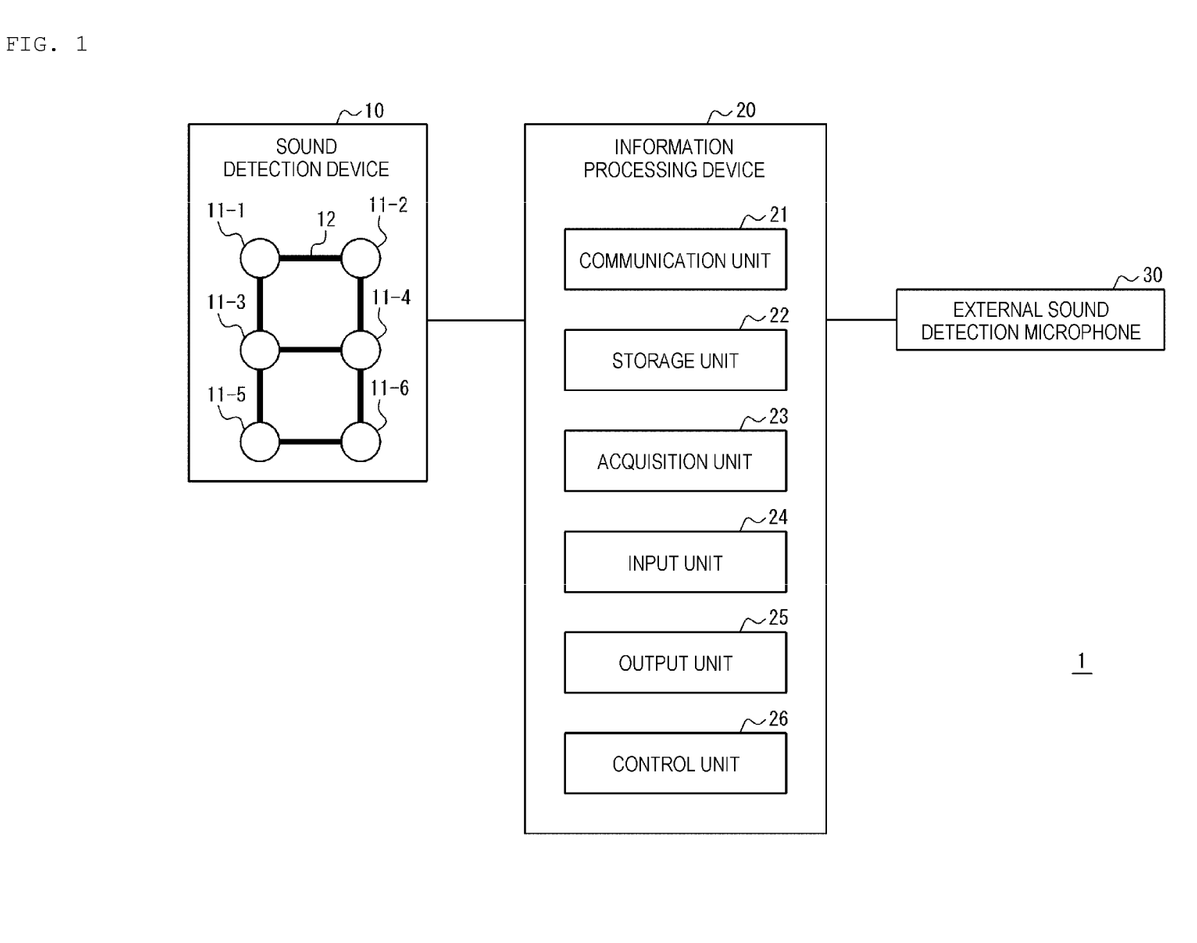
FIG. 1 is a functional block diagram of a sound detection system according to a first embodiment of the present disclosure.

FIG. 1 is a functional block diagram of a sound detection system 1 according to a first embodiment of the present disclosure. A configuration and an overview of the sound detection system 1 according to the first embodiment of the present disclosure will be described with reference to FIG. 1.

The sound detection system 1 includes a sound detection device 10, an information processing device 20, and an external sound detection microphone 30.

The sound detection device 10 is a device that can be affixed to a living body such as a human body and is capable of detecting sounds inside the living body. The sound detection device 10 outputs sound signals generated based on the detected sounds inside the living body to the information processing device 20. The sound detection device 10 may be connected to the information processing device 20 in a wired manner or may be communicably connected to the information processing device 20 in a wireless manner.

The sound detection device 10 includes a plurality of microphones 11-1 to 11-6 and a first coupling member 12. When it is not necessary to particularly distinguish the microphones 11-1 to 11-6, the microphones 11-1 to 11-6 may be simply referred to as microphones 11 hereinafter. In FIG. 1, six microphones 11-1 to 11-6 are shown, but the number of the microphones 11 is not limited to six. The number of microphones 11 may be any number of two or more microphones.

The microphones 11 can be affixed to a surface of a living body such as a human body. The microphones 11 can detect a sound inside the living body in a state in which the microphones 11 are affixed on the surface of the living body. Each of the microphones 11 may be provided with, for example, an adhesive sheet, and may be affixed to the living body by the adhesive sheet. A method of affixing the microphones 11 to the living body is not limited to the affixing. The microphones 11 may be affixed to the living body by a method other than the affixing.

The microphones 11 output the sound signals generated based on the detected sound inside the living body to the information processing device 20. The microphones 11 may be connected to the information processing device 20 in a wired manner. In addition, the microphones 11 may have a wireless communication function. When the microphones 11 have a wireless communication function, the microphones 11 may be communicably connected to the information processing device 20 in a wireless manner.

The first coupling member 12 couples the plurality of microphones 11 such that relative positions of the plurality of microphones 11 are fixed. The first coupling member 12 may be made of, for example, a relatively rigid material in order to make the relative positions of the plurality of microphones 11 fixed.

In the example shown in FIG. 1, the first coupling member 12 couples the microphone 11-1 and the microphone 11-2. In addition, the first coupling member 12 couples the microphone 11-3 and the microphone 11-4. In addition, the first coupling member 12 couples the microphone 11-5 and the microphone 11-6. In addition, the first coupling member 12 couples the microphone 11-1 and the microphone 11-3. In addition, the first coupling member 12 couples the microphone 11-3 and the microphone 11-5. In addition, the first coupling member 12 couples the microphone 11-2 and the microphone 11-4. In addition, the first coupling member 12 couples the microphone 11-4 and the microphone 11-6.

Figure 2:
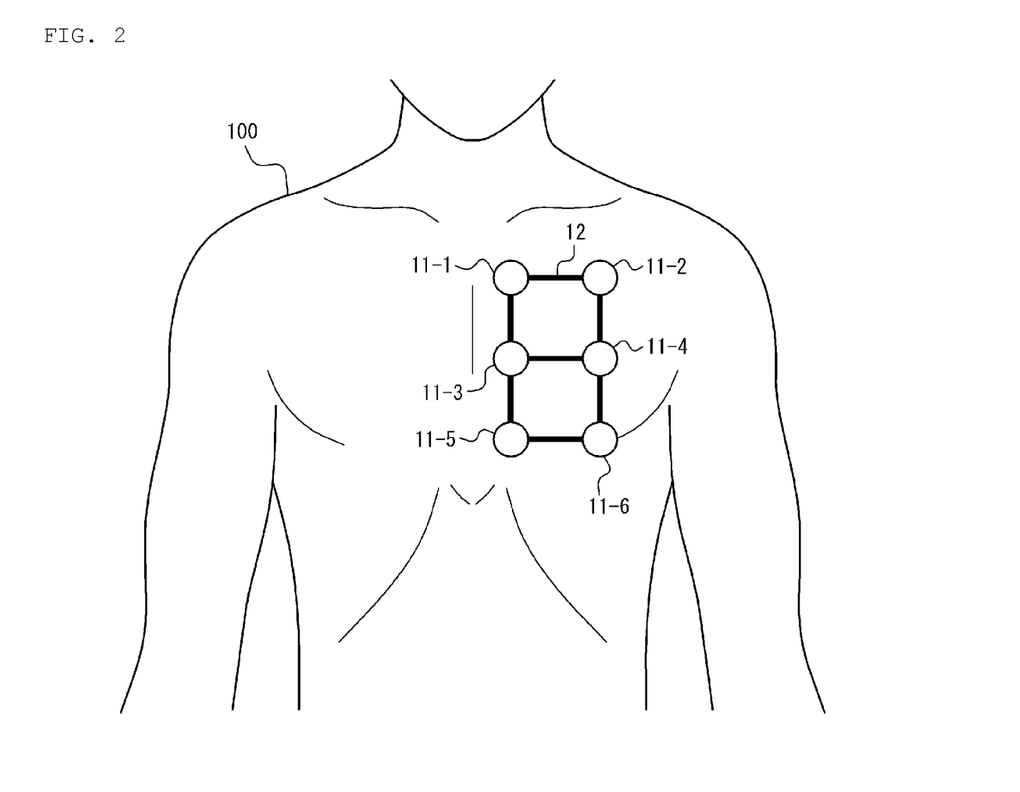
FIG. 2 is a diagram showing an example in which a plurality of microphones whose relative positions are fixed are affixed in the vicinity of a heart of a human body.

The sound detection device 10 is used by being affixed to the surface of the living body in the vicinity where a sound to be detected is assumed to be generated. In the present embodiment, a case in which the sound to be detected is a stenosis sound in a coronary artery will be described as an example. In this case, the plurality of microphones 11-1 to 11-6 of the sound detection device 10 are affixed in the vicinity of the heart of the human body. FIG. 2 shows an example of the case in which the plurality of microphones 11-1 to 11-6 are affixed in the vicinity of a heart of a human body 100.

The information processing device 20 may be a dedicated computer used in the sound detection system 1 or may be a general-purpose computer. When the information processing device 20 is the general-purpose computer, the information processing device 20 may be, for example, a tablet terminal, a smartphone, a notebook personal computer (PC), a desktop PC, or the like.

The information processing device 20 acquires the sound signals generated based on the sounds detected by the sound detection device 10 from the sound detection device 10. In addition, the information processing device 20 acquires sound information generated based on sounds detected by the external sound detection microphone 30 from the external sound detection microphone 30.

The information processing device 20 processes the sound signals acquired from the sound detection device 10 to increase a sensitivity to a weak sound to be detected. Thereafter, a configuration of the information processing device 20 will be described, and a detail of an operation of the information processing device 20 will be described below.

The information processing device 20 includes a communication unit 21, a storage unit 22, an acquisition unit 23, an input unit 24, an output unit 25, and a control unit 26.

The communication unit 21 includes at least one communication interface. The communication interface can be, for example, a local area network (LAN) interface, a Bluetooth® interface, or the like. The communication unit 21 can communicate with various devices via a network or directly. When the sound detection device 10 has a wireless communication function, the communication unit 21 can communicate with the sound detection device 10 in a wireless manner. When the external sound detection microphone 30 has a wireless communication function, the communication unit 21 can communicate with the external sound detection microphone 30 in a wireless manner.

The storage unit 22 can be, for example, a semiconductor memory, a magnetic memory, or an optical memory, but is not limited to a semiconductor memory, a magnetic memory, or an optical memory. The storage unit 22 may function as, for example, a main storage device, an auxiliary storage device, or a cache memory. The storage unit 22 stores any information used for the operation of the information processing device 20. For example, the storage unit 22 may store a system program, an application program, various types of information received by the communication unit 21, and the like. The information stored in the storage unit 22 may be updated by, for example, the information received via the communication unit 21. A part of the storage unit 22 may be provided outside the information processing device 20. In that case, the part of the storage unit 22 provided outside the information processing device 20 may be connected to the information processing device 20 via any interface.

The acquisition unit 23 acquires the sound signals generated based on the sounds detected by the sound detection device 10 from the sound detection device 10. The acquisition unit 23 may acquire the sound signals from the sound detection device 10 via the communication unit 21.

The acquisition unit 23 acquires the sound information generated based on the sounds detected by the external sound detection microphone 30 from the external sound detection microphone 30. The acquisition unit 23 may acquire the sound signal from the external sound detection microphone 30 via the communication unit 21.

The input unit 24 includes one or more input interfaces that detect an input from a user and acquire input information generated based on an operation of the user. For example, the input unit 24 may be a physical key, a capacitance key, a touch screen provided integrally with a display of the output unit 25, a microphone that receives a sound input, or the like, but is not limited a physical key, a capacitance key, a touch screen or a microphone.

The output unit 25 includes one or more output interfaces that output information and notify the user of the information. For example, the output unit 25 includes, but is not limited to, a display that outputs the information as a video, a speaker that outputs the information as a sound, or the like. The output unit 25 may be capable of outputting the information in various forms.

The control unit 26 includes at least one processor, at least one dedicated circuit, or a combination of at least one processor and at least one dedicated circuit. The processor is a general-purpose processor such as a central processing unit (CPU) or a graphics processing unit (GPU), or a dedicated processor specialized for a specific process. The dedicated circuit can be, for example, a field-programmable gate array (FPGA) or an application-specific integrated circuit (ASIC). The control unit 26 executes a process related to the operation of the information processing device 20 while controlling each unit of the information processing device 20.

The external sound detection microphone 30 can be a microphone capable of detecting an external sound. Here, the term "external sound" is a sound that is noise with respect to the sound detected by the sound detection device 10, such as an environmental sound around the sound detection system 1. The external sound detection microphone 30 outputs sound signals generated based on the detected external sounds to the information processing device 20. The external sound detection microphone 30 may be connected to the information processing device 20 in a wired manner or may be communicably connected to the information processing device 20 in a wireless manner.

Operation of Sound Detection System

Next, an operation of the sound detection system 1 shown in FIG. 1 will be described.

The sound detection system 1 can increase a detection sensitivity with respect to the weak sound inside the living body. In the following description, a case of detecting the stenosis sound in the coronary artery as the weak sound inside the living body will be described as an example.

A user of the sound detection system 1 affixes the sound detection device 10 around a position where the weak sound to be detected is assumed to be generated. For example, when the stenosis sound in the coronary artery is to be detected, the user of the sound detection system 1 affixes the sound detection device 10 to the vicinity of the heart of the human body. FIG. 2 is a diagram showing a state in which the microphones 11-1 to 11-6 provided in the sound detection device 10 are affixed in the vicinity of the heart of the human body 100.

Each of the microphones 11-1 to 11-6 outputs the sound signals generated based on the detected sounds inside the human body to the information processing device 20.

The acquisition unit 23 of the information processing device 20 acquires the sound signals generated based on the sounds detected by the plurality of microphones 11-1 to 11-6 from the plurality of microphones 11-1 to 11-6.

The acquisition unit 23 acquires the sound signals generated based on the external sounds detected by the external sound detection microphone 30 from the external sound detection microphone 30.

The control unit 26 of the information processing device 20 performs noise cancellation by subtracting, from the sound signals acquired from the microphones 11-1 to 11-6, the sound signals acquired from the external sound detection microphone 30. Accordingly, the sound detection system 1 can reduce a noise component caused by the external sounds, which is included in the sound signals acquired from the microphones 11-1 to 11-6.

In accordance with an aspect, it is not essential for the sound detection system 1 to perform the noise cancellation, and the sound detection system 1 may not perform the noise cancellation. In a case of a configuration in which the noise cancellation is not performed, the sound detection system 1 may not include the external sound detection microphone 30.

The control unit 26 specifies a first position, which is a position of a prescribed living body site, based on the sound signals acquired by the acquisition unit 23. The sound signals acquired by the acquisition unit 23 may be or may not be subjected to the noise cancellation. Here, the "first position" is a position of the living body site that is in a prescribed relative positional relation with the position where the weak sound to be detected is assumed to be generated. When the stenosis sound in the coronary artery is to be detected, the position where the weak sound is assumed to be generated is a position of the coronary artery. Hereafter, the position where the weak sound is assumed to be generated is also referred to as a "second position".

When the second position is the position of the coronary artery, the prescribed living body site at the first position that is in the prescribed relative positional relation with the second position can be, for example, a mitral valve, a tricuspid valve, a pulmonary valve, or an aortic valve. Since the living body site at the first position is a living body site where a sound larger than the weak sound to be detected is generated, the microphones 11 can detect a sound generated at the first position more easily than a sound generated at the second position.

The storage unit 22 stores information on the relative positional relation between the first position and the second position. The storage unit 22 stores, for at least one first position, the information on the relative positional relation between the first position and the second position. When the second position is the position of the coronary artery, the first position can be, for example, a position of a mitral valve, a position of a tricuspid valve, a position of a pulmonary valve, or a position of an aortic valve. In this case, the storage unit 22 stores at least one relative positional relation among a relative positional relation between the position of the mitral valve and the position of the coronary artery, a relative positional relation between the position of the tricuspid valve and the position of the coronary artery, a relative positional relation between the position of the pulmonary valve and the position of the coronary artery, and a relative positional relation between the position of the aortic valve and the position of the coronary artery.

As described, the heart sounds include a sound referred to as an I sound and a sound referred to as an II sound. The I sound is a sound that can be heard when a mitral valve and a tricuspid valve close. The II sound is a sound that can be heard when a pulmonary valve and an aortic valve close.

The I sound is a sound in which a sound generated when the mitral valve closes and a sound generated when the tricuspid valve closes are superimposed. The II sound is a sound in which a sound generated when the pulmonary valve closes and a sound generated when the aortic valve closes are superimposed.

The storage unit 22 stores a feature of the sound generated when the mitral valve closes, which is extracted based on a sample of the sound generated when the mitral valve closes. The feature may include, for example, a spectral feature obtained by frequency analysis such as fast Fourier transform (FFT).

The sample of the sound generated when the mitral valve closes may be a sample obtained by measuring a subject, or may be a sample obtained by measuring another subject.

Similarly, the storage unit 22 stores a feature of the sound generated when the tricuspid valve closes, a feature of the sound generated when the pulmonary valve closes, and a feature of the sound generated when the aortic valve closes. It is an example that the storage unit 22 stores the feature of the sound generated when the mitral valve closes, the feature of the sound generated when the tricuspid valve closes, the feature of the sound generated when the pulmonary valve closes, and the feature of the sound generated when the aortic valve closes, and the storage unit 22 stores a feature of any sound that is assumed to be generated at the first position.

The control unit 26 executes the frequency analysis such as FFT on the sound signals acquired by the acquisition unit 23 from the sound detection device 10, and extracts the feature included in the sound signals. The control unit 26 compares the extracted feature with features of various samples stored in the storage unit 22, and specifies which sound is included in the sound signals acquired by the acquisition unit 23.

The control unit 26 specifies, for example, at a timing when the I sound is generated, that the sound signals acquired by the acquisition unit 23 include the sound generated when the mitral valve closes and the sound generated when the tricuspid valve closes. The control unit 26 specifies, for example, at a timing when the II sound is generated, that the sound signals acquired by the acquisition unit 23 include the sound generated when the pulmonary valve closes and the sound generated when the aortic valve closes.

When the control unit 26 specifies the type of the sound, the control unit 26 also specifies the first position that is a position where the sound is generated. For example, when the control unit 26 specifies that the sound generated when the mitral valve closes is included in the sound signals acquired by the acquisition unit 23, the control unit 26 specifies a position where the sound generated when the mitral valve closes is generated, that is, the position of the mitral valve.

The specification of the first position performed by the control unit 26 will be described with reference to FIGS. 3A and 3B. Waveforms shown in FIGS. 3A and 3B schematically show sound signals generated at the first position.

Figure 3A:
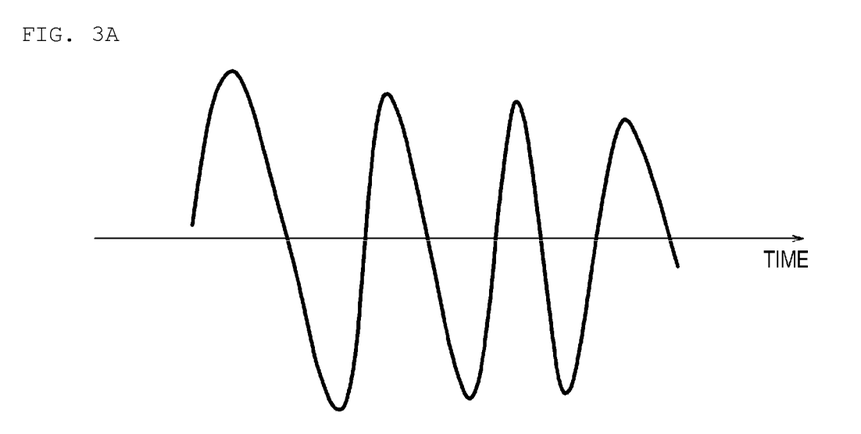
FIG. 3A is a diagram showing an example of a sound signal.
Figure 3B:
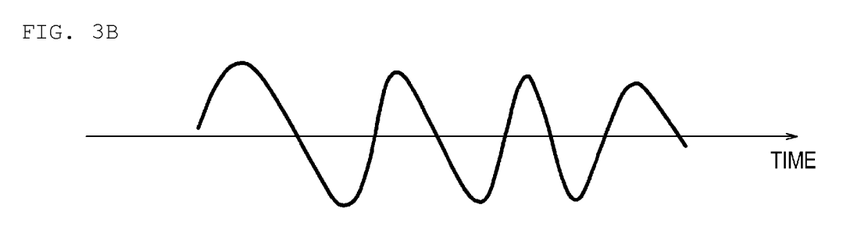
FIG. 3B is a diagram showing an example of a sound signal.

FIG. 3A is a sound signal detected by the microphone 11 affixed at a position close to the first position. FIG. 3B is a sound signal detected by the microphone 11 affixed at a position far from the first position. When the sound signal of FIG. 3B is observed, an amplitude is relatively small and a phase is delayed as compared with the sound signal of FIG. 3A. In this way, the amplitude and the phase of the sound signal depend on a distance from the first position. Therefore, if the relative positions of the plurality of microphones 11-1 to 11-6 are known, the first position can be specified based on the amplitude and the phase of the sound signal generated based on the sound detected by each of the microphones 11 and the relative positions of the plurality of microphones 11-1 to 11-6.

The relative positions of the plurality of microphones 11-1 to 11-6 are fixed, and information on the relative positions of the plurality of microphones 11-1 to 11-6 is stored in the storage unit 22.

The control unit 26 specifies the first position based on an amplitude and a phase of a sound signal, which is generated based on a sound whose sound source is the prescribed living body site and is acquired from each of the microphones 11, and the relative positions of the plurality of microphones 11-1 to 11-6. For example, when the prescribed living body site is the mitral valve, the control unit 26 specifies the position of the mitral valve based on an amplitude and a phase of a sound signal, which is generated based on a sound whose sound source is the mitral valve and is acquired by the acquisition unit 23 from each of the microphones 11, and the relative positions of the plurality of microphones 11-1 to 11-6.

The control unit 26 specifies the position of the tricuspid valve, the position of the pulmonary valve, and the position of the aortic valve in the same manner.

It is not essential for the control unit 26 to specify all of the position of the mitral valve, the position of the tricuspid valve, the position of the pulmonary valve, and the position of the aortic valve as the first position. The control unit 26 may specify at least one position among the position of the mitral valve, the position of the tricuspid valve, the position of the pulmonary valve, and the position of the aortic valve as the first position.

The control unit 26 may cause the output unit 25 to output, when the specified first position is away from positions of the plurality of microphones 11-1 to 11-6 by a prescribed distance or farther, notification information for recommending movement of the positions of the plurality of microphones 11-1 to 11-6. Further, the control unit 26 may cause the output unit 25 to output information for navigating affixing positions of the plurality of microphones 11-1 to 11-6 such that a position in the vicinity of a center surrounded by the plurality of microphones 11-1 to 11-6 is in the vicinity of the first position.

When the first position is specified, the control unit 26 estimates the second position based on the information on the relative positional relation between the first position and the second position, which is stored in the storage unit 22. When the stenosis sound in the coronary artery is to be detected, the control unit 26 estimates the position of the coronary artery as the second position.

Figure 4:
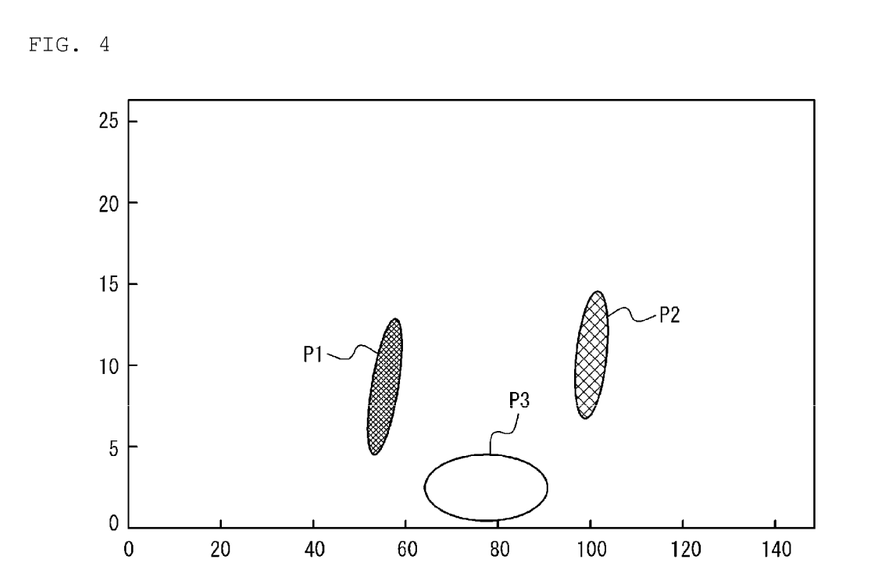
FIG. 4 is a diagram showing an example of estimating a second position based on a first position.

FIG. 4 shows a schematic diagram in which the control unit 26 estimates the position of the coronary artery based on the position of the aortic valve and the position of the pulmonary valve. In FIG. 4, P1 is the position of the aortic valve specified by the control unit 26 based on the sound signals acquired by the acquisition unit 23. P2 is the position of the pulmonary valve specified by the control unit 26 based on the sound signals acquired by the acquisition unit 23. P3 is the position of the coronary artery estimated by the control unit 26 based on P1 and P2.

When the second position is estimated, the control unit 26 controls directivities of the plurality of microphones 11-1 to 11-6 to increase a sensitivity with respect to the second position. For example, the control unit 26 controls the directivities of the plurality of microphones 11-1 to 11-6 by adjusting a delay amount of the sound signal acquired from each of the microphones 11-1 to 11-6 and combining the adjusted delay amounts. The control unit 26 can acquire the sound signal generated at the second position with a relatively high sensitivity by controlling the directivities of the plurality of microphones 11-1 to 11-6 to increase the sensitivity with respect to the second position.

For example, when the control unit 26 controls the directivities of the plurality of microphones 11-1 to 11-6, the control unit 26 may not use all of the sound signals of the microphones 11-1 to 11-6. The control unit 26 may control the directivities of the microphones 11 using sound signals of at least two microphones 11 among the plurality of microphones 11-1 to 11-6.

The output unit 25 outputs information generated based on the sound signals acquired by the acquisition unit 23 in a state in which the directivities of the plurality of microphones 11-1 to 11-6 are controlled to increase the sensitivity with respect to the second position. The output unit 25 may output the information generated based on the sound signals acquired by the acquisition unit 23 in various forms.

For example, the output unit 25 may display, on the display, a sound signal in a graph format in which a horizontal axis is a time axis and a vertical axis is an amplitude. In addition, for example, the output unit 25 may output the sound signal as a sound from the speaker.

The control unit 26 may determine an intensity of a sound signal acquired from the second position, and cause the output unit 25 to output an index generated based on the determination result. For example, the control unit 26 may determine whether the intensity of the sound signal acquired from the second position is equal to or greater than a prescribed threshold value. For example, the control unit 26 may cause the output unit 25 to display an indication such as "there is a stenosis sound in the coronary artery" when the intensity of the sound signal acquired from the second position is equal to or greater than the prescribed threshold value. For example, the control unit 26 may compare the intensity of the sound signal acquired from the second position with a plurality of threshold values, and may perform the determination in multiple stages. For example, the control unit 26 may calculate, based on an intensity of the stenosis sound in the coronary artery, an index of a degree at which stenosis is assumed to be present (referred to as a "stenosis degree"), and cause the output unit 25 to display an indication such as, for example, "stenosis degree: 0.8".

The control unit 26 may perform the determination process on the sound signal generated at the second position using a learning model trained by machine learning. The learning model may be a learning model trained based on, for example, an actual stenosis sound in the coronary artery. The learning model may be stored in the storage unit 22.

Figure 5A:
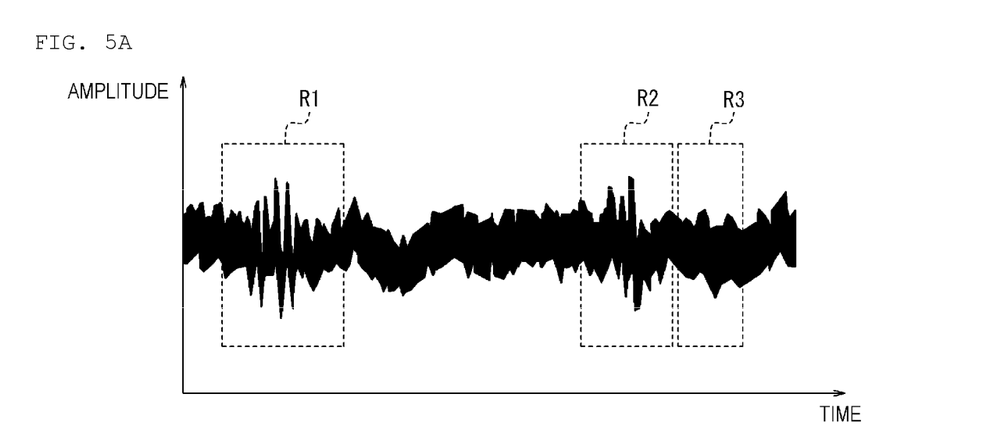
FIG. 5A is a diagram illustrating an effect of noise cancellation and an effect of controlling directivities of the plurality of microphones.
Figure 5B:
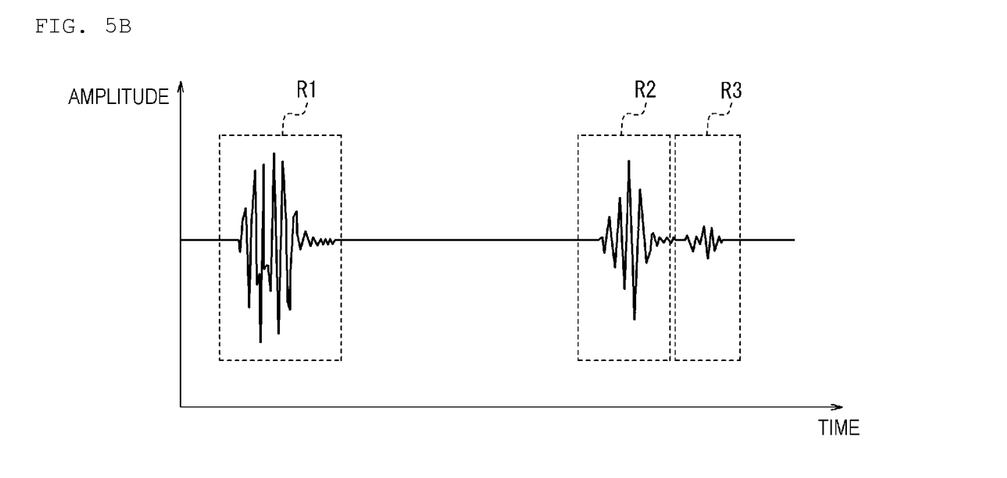
FIG. 5B is a diagram illustrating an effect of noise cancellation and an effect of controlling the directivities of the plurality of microphones.
Figure 5C:
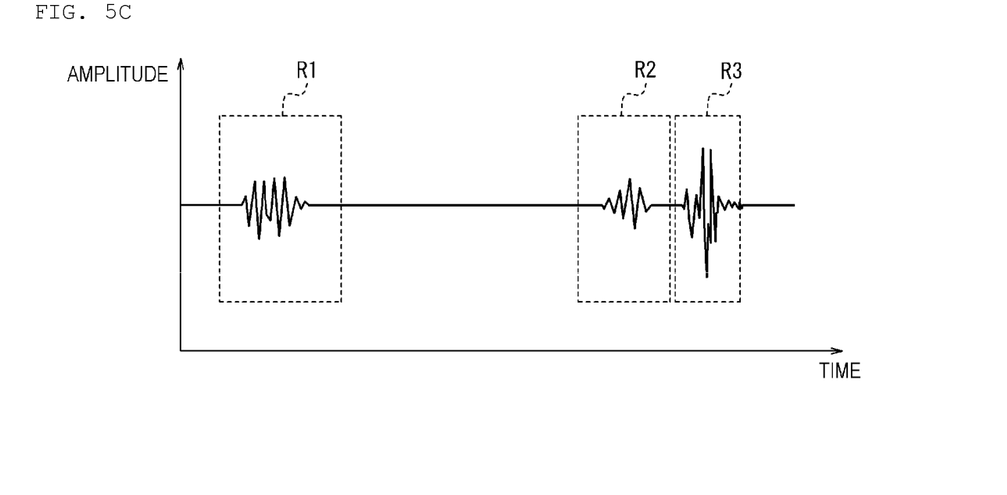
FIG. 5C is a diagram illustrating an effect of noise cancellation and an effect of controlling the directivities of the plurality of microphones.

FIGS. 5A to 5C show schematic diagrams each showing a state in which the stenosis sound in the coronary artery that is a weak sound signal is acquired with a relatively high sensitivity. FIG. 5A is a schematic diagram showing a sound signal before performing the noise cancellation and controlling the directivities of the microphones 11. FIG. 5B is a schematic diagram showing the sound signal in a stage at which the noise cancellation is performed. FIG. 5C is a schematic diagram showing the sound signal in a stage at which the controlling on the directivities of the microphones 11 is performed in addition to the noise cancellation.

In FIGS. 5A to 5C, a region indicated by R1 is a region in which the I sound is detected. A region indicated by R2 is a region in which the II sound is detected. R3 shows a region in which the stenosis sound in the coronary artery is detected.

Referring to FIG. 5A, it may be difficult to determine whether the stenosis sound in the coronary artery is generated in R3. Referring to FIG. 5B, by executing the noise cancellation, the stenosis sound in the coronary artery is slightly observed in R3, but is still weak. Referring to FIG. 5C, by controlling the directivities of the microphones 11, the stenosis sound in the coronary artery detected in R3 can be emphasized.

Figure 6:
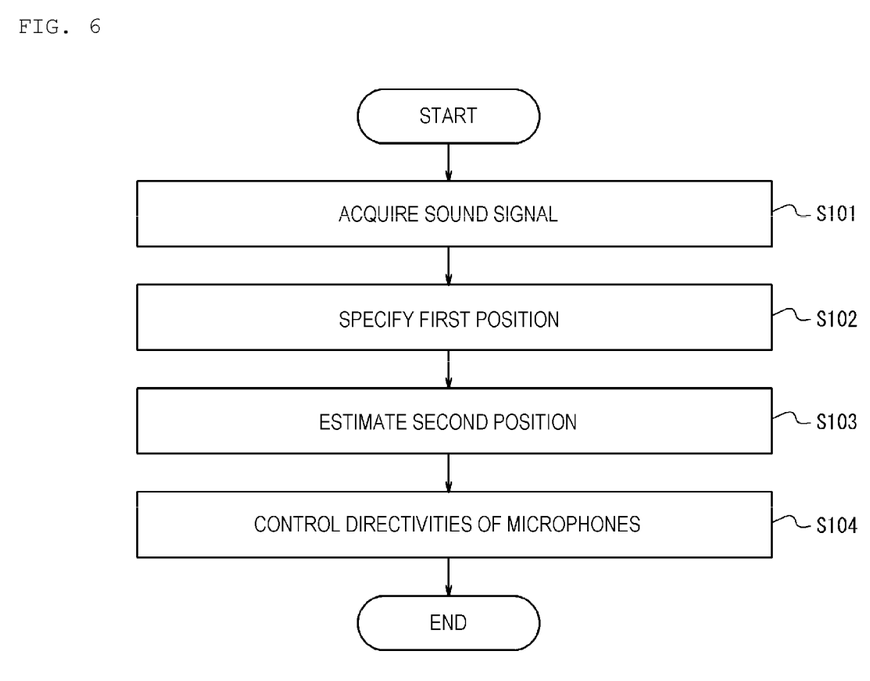
FIG. 6 is a flowchart showing an example of an operation of the sound detection system according to the first embodiment of the present disclosure.

An operation of the sound detection system 1 will be described with reference to a flowchart shown in FIG. 6. The operation shown in FIG. 6 is executed in a state in which the plurality of microphones 11-1 to 11-6 of the sound detection device 10 are affixed to the living body.

The acquisition unit 23 of the information processing device 20 acquires the sound signals from the plurality of microphones 11-1 to 11-6 (step S101).

The control unit 26 of the information processing device 20 specifies the first position based on the sound signals acquired by the acquisition unit 23 in step S101 (step S102). When the control unit 26 specifies the first position, the control unit 26 may specify the first position using the sound signals after the noise cancellation.

The control unit 26 estimates the second position based on the first position specified in step S102 (step S103).

The control unit 26 controls the directivities of the plurality of microphones 11-1 to 11-6 to increase the sensitivity with respect to the second position estimated in step S103 (step S104). The control unit 26 may cause the output unit 25 to output the information generated based on the sound signals acquired by the acquisition unit 23 in the state in which the directivities of the plurality of microphones 11-1 to 11-6 are controlled to increase the sensitivity with respect to the second position.

In this way, according to the sound detection system 1 of the present embodiment, the acquisition unit 23 acquires the sound signals generated based on the sounds inside the living body from the plurality of microphones 11-1 to 11-6. The control unit 26 specifies the first position that is the position of the prescribed living body site based on the sound signals acquired by the acquisition unit 23, estimates the second position that is in the prescribed relative positional relation with the first position, and controls the directivities of the plurality of microphones 11-1 to 11-6 to increase the sensitivity with respect to the second position. Further, the output unit 25 outputs the information generated based on the sound signals acquired by the acquisition unit 23 in the state in which the directivities of the plurality of microphones 11-1 to 11-6 are controlled to increase the sensitivity with respect to the second position. Accordingly, the sound detection system 1 according to the present embodiment can increase the detection sensitivity with respect to the weak sound inside the living body.

In addition, by increasing the detection sensitivity with respect to the weak sound inside the living body, the sound detection system 1 according to the present embodiment can detect the weak sound such as a stenosis sound in a coronary artery by simple measurement using the plurality of microphones 11-1 to 11-6.

Second Embodiment

Figure 7:
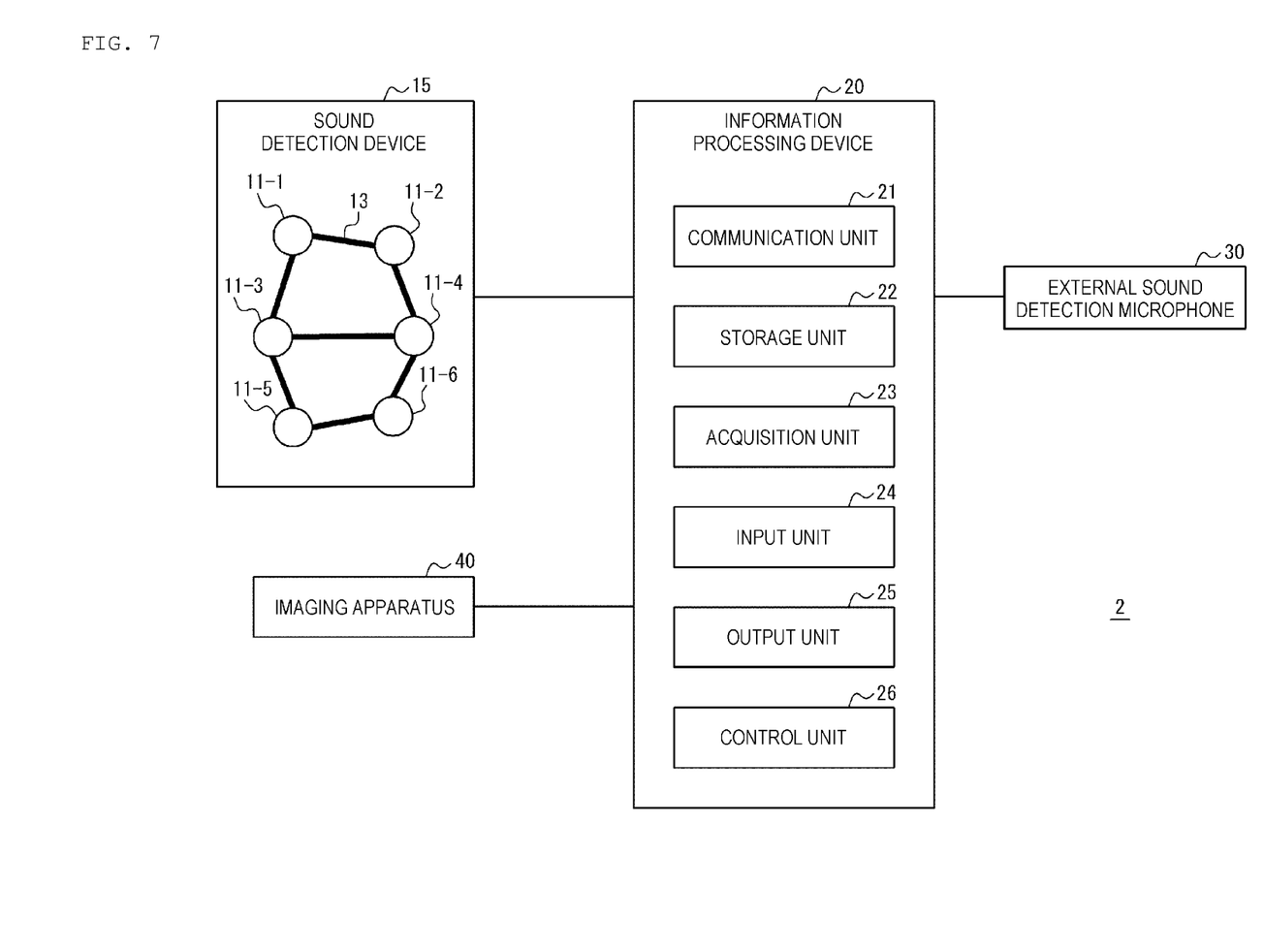
FIG. 7 is a functional block diagram of a sound detection system according to a second embodiment of the present disclosure.

FIG. 7 is a functional block diagram of a sound detection system 2 according to a second embodiment of the present disclosure. The sound detection system 2 includes a sound detection device 15, the information processing device 20, the external sound detection microphone 30, and an imaging apparatus 40.

For the sound detection system 2 according to the second embodiment, differences from the sound detection system 1 according to the first embodiment will be mainly described, and descriptions of points common to and similar to the sound detection system 1 according to the first embodiment will be appropriately omitted.

The sound detection device 15 includes a plurality of microphones 11-1 to 11-6 and a second coupling member 13. In FIG. 7, six microphones 11-1 to 11-6 are shown, but the number of microphones 11 is not limited to six. The number of microphones 11 may be any number of two or more.

The second coupling member 13 is different from the first coupling member 12 shown in FIG. 1, and couples the microphones 11-1 to 11-6 such that relative positions of the plurality of microphones 11-1 to 11-6 are variable. The second coupling member 13 may be made of, for example, an elastic material such as rubber.

In an example shown in FIG. 7, the second coupling member 13 couples the microphone 11-1 and the microphone 11-2. In addition, the second coupling member 13 couples the microphone 11-3 and the microphone 11-4. In addition, the second coupling member 13 couples the microphone 11-5 and the microphone 11-6. In addition, the second coupling member 13 couples the microphone 11-1 and the microphone 11-3. In addition, the second coupling member 13 couples the microphone 11-3 and the microphone 11-5. In addition, the second coupling member 13 couples the microphone 11-2 and the microphone 11-4. In addition, the second coupling member 13 couples the microphone 11-4 and the microphone 11-6.

Figure 8:
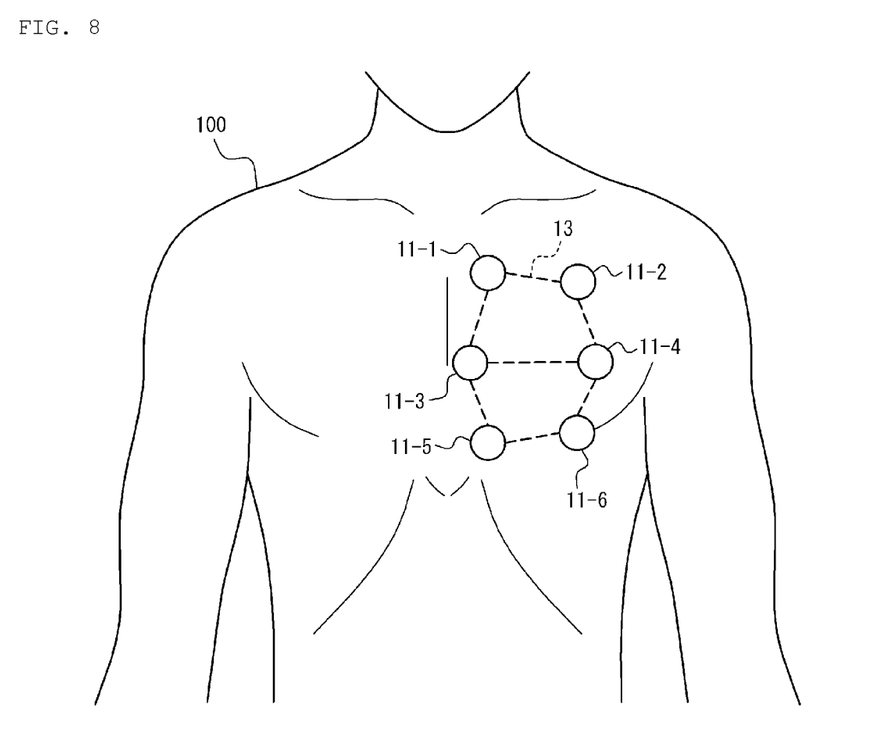
FIG. 8 is a diagram showing an example in which a plurality of microphones whose relative positions are variable are affixed in the vicinity of a heart of a human body.

FIG. 8 shows an example of a case in which the plurality of microphones 11-1 to 11-6 are affixed in the vicinity of a heart of the human body 100. In the sound detection device 15 according to the second embodiment, since the second coupling member 13 couples the microphones 11-1 to 11-6 such that the relative positions of the plurality of microphones 11-1 to 11-6 are variable, the plurality of microphones 11-1 to 11-6 can be affixed to desired positions of the human body 100 with a relatively high degree of freedom. For example, a user can affix the plurality of microphones 11-1 to 11-6 while avoiding obstacles such as ribs.

The imaging apparatus 40 can image the plurality of microphones 11-1 to 11-6 in a state of being affixed to the living body. When the user captures an image of the plurality of microphones 11-1 to 11-6, the imaging apparatus 40 outputs the captured image to the information processing device 20.

The imaging apparatus 40 may be connected to the information processing device 20 in a wired manner. In addition, the imaging apparatus 40 may have a wireless communication function. When the imaging apparatus 40 has a wireless communication function, the imaging apparatus 40 may transmit the captured image to the information processing device 20 in a wireless manner.

The acquisition unit 23 of the information processing device 20 acquires the image of the plurality of microphones 11-1 to 11-6 captured by the imaging apparatus 40.

The control unit 26 of the information processing device 20 analyzes the image of the plurality of microphones 11-1 to 11-6 acquired by the acquisition unit 23, and calculates the relative positions of the plurality of microphones 11-1 to 11-6. The control unit 26 can specify, by using the calculated relative positions of the plurality of microphones 11-1 to 11-6, a first position based on sound signals acquired by the acquisition unit 23 in the same manner as that of the first embodiment.

Other operations of the sound detection system 2 according to the second embodiment are the same as the operations of the sound detection system 1 according to the first embodiment. In addition, the sound detection system 2 according to the second embodiment achieves the same effect as the effect of the sound detection system 1 according to the first embodiment.

The present disclosure is not limited to the configurations specified in the embodiments described above, and various modifications can be made without departing from the gist of the disclosure described in the claims. For example, functions and the like included in each component, each step, and the like can be rearranged in a manner of not being logically contradictory, and a plurality of components, steps, and the like can be combined into one or divided.

For example, although the sound detection device 10, the information processing device 20, and the external sound detection microphone 30 are shown as separate devices in FIG. 1, the present disclosure is not limited to this configuration. The sound detection device 10 may be incorporated into the information processing device 20. The external sound detection microphone 30 may be incorporated into the information processing device 20.

In addition, for example, in the description of the second embodiment, it is described that the image of the plurality of microphones 11-1 to 11-6 captured by the imaging apparatus 40 is analyzed to calculate the relative positions of the plurality of microphones 11-1 to 11-6, but a method of calculating the relative positions of the plurality of microphones 11-1 to 11-6 whose relative positions are variable is not limited thereto. The sound detection system 2 according to the second embodiment may include a relative position measurement unit capable of measuring the relative position of each of the plurality of microphones 11-1 to 11-6, and the control unit 26 may calculate the relative positions of the plurality of microphones 11-1 to 11-6 based on the relative position of each of the plurality of microphones 11-1 to 11-6 measured by the relative position measurement unit. The relative position measurement unit may include, for example, a strain sensor and an angle sensor. For example, if the second coupling member 13 shown in FIG. 7 is implemented by an elastic strain sensor, the strain sensor can measure distances between the microphones 11. In addition, the angle sensor can measure angles between the microphones 11. The control unit 26 may calculate the relative positions of the plurality of microphones 11-1 to 11-6 based on the measurement result of the strain sensor and the measurement result of the angle sensor. In addition, the relative position measurement unit may include, for example, a magnetic field generation device and magnetic sensors provided in the plurality of microphones 11-1 to 11-6. The magnetic sensors can measure the angles between the microphones 11. The control unit 26 may calculate the relative positions of the plurality of microphones 11-1 to 11-6 based on the measurement results of the magnetic sensors.

In addition, although the sound detection device 15, the information processing device 20, the external sound detection microphone 30, and the imaging apparatus 40 are shown as separate devices in FIG. 7, the present disclosure is not limited to this configuration. The sound detection device 15 may be incorporated into the information processing device 20. The external sound detection microphone 30 may be incorporated into the information processing device 20. The imaging apparatus 40 may be incorporated into the information processing device 20.

In addition, in each of the embodiments, a case of detecting the stenosis sound in the coronary artery as the weak sound is described as an example, but the weak sound to be detected is not limited to the stenosis sound in the coronary artery. The sound detection system 1 according to the first embodiment and the sound detection system 2 according to the second embodiment can also be applied to a case of detecting weak sounds other than the stenosis sound in the coronary artery.

The detailed description above describes embodiments of a sound detection system and an information processing device. These disclosed embodiments represent examples of the sound detection system and an information processing device disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A sound detection system comprising:
   a plurality of microphones, each of the plurality of microphones configured to detect a sound inside a living body and output a sound signal generated based on the detected sound; and
   an information processing device, wherein the information processing device:
     acquires the sound signals from the plurality of microphones;
     specifies a first position that is a position of a prescribed living body site based on the acquired sound signals;
     estimates a second position in the living body site, the second position being different than the first position and in a prescribed positional relation with the first position, and wherein the second position in the living body produces a sound that is relatively weaker than a sound being produced by the first position;
     controls directivities of the plurality of microphones to increase a sensitivity with respect to the second position; and
     outputs information generated based on the acquired sound signals in a state in which the directivities of the plurality of microphones are controlled to increase the sensitivity with respect to the second position.

2. The sound detection system according to claim 1, wherein the information processing device further includes a memory configured to store information on the prescribed positional relation between the first position and the second position.

3. The sound detection system according to claim 1, wherein the information processing device:
specifies the first position based on an amplitude and a phase of the sound signal, which is generated based on a sound whose sound source is the prescribed living body site and acquired from each of the microphones, and positions of the plurality of microphones.

4. The sound detection system according to claim 1, wherein the information processing device:
controls the directivities of the plurality of microphones by adjusting a delay amount of the sound signal acquired from each of the microphones and combining the adjusted delay amounts.

5. The sound detection system according to claim 1, wherein the information processing device:
determines an intensity of a sound signal acquired from the second position, and to output an index generated based on the determination result.

6. The sound detection system according to claim 1, wherein the information processing device:
controls the directivities of at least two microphones among the plurality of microphones to increase the sensitivity with respect to the second position.

7. The sound detection system according to claim 1, wherein the information processing device:
outputs, when the first position is away from positions of the plurality of microphones by a prescribed distance or farther, notification information for recommending movement of the positions of the plurality of microphones.

8. The sound detection system according to claim 1, wherein positions of the plurality of microphones are fixed.

9. The sound detection system according to claim 1, wherein positions of the plurality of microphones are variable; and
the to information processing device:
measures the position of each of the plurality of microphones; and
calculates the positions of the plurality of microphones based on the measured position of each of the plurality of microphones.

10. The sound detection system according to claim 1 further comprising:
an imaging apparatus;
positions of the plurality of microphones are variable;
the information processing device calculates the positions of the plurality of microphones based on an image of the plurality of microphones captured by the imaging apparatus; and
wherein the first position is one of a position of a mitral valve, a position of a tricuspid valve, a position of a pulmonary valve, or a position of an aortic valve, and the second position is a position of a coronary artery.

11. A sound detection system comprising:
a plurality of microphones, each of the plurality of microphones configured to detect a sound inside a living body and output a sound signal generated based on the detected sound; and
a computer that:
acquires the sound signals from the plurality of microphones;
specifies a first position that is a position of a prescribed living body site based on the acquired sound signals;
estimates a second position in the living body site, the second position being different than the first position and in a prescribed positional relation with the first position, and wherein the second position in the living body produces a sound that is relatively weaker than a sound being produced by the first position;
controls directivities of the plurality of microphones to increase a sensitivity with respect to the second position; and
outputs information generated based on the acquired sound signals in a state in which the directivities of the plurality of microphones are controlled to increase the sensitivity with respect to the second position.

12. A method for detecting sound inside a living body, the method comprising:
affixing a plurality of microphones to the living body, each of the plurality of microphones configured to detect a sound inside the living body and output a sound signal generated based on the detected sound;
acquiring, by an information processing device, the sound signals from the plurality of microphones;
specifying, by the information processing device, a first position that is a position of a prescribed living body site based on the acquired sound signals output;
estimating, by the information processing device, a second position in the living body site, the second position being different than the first position and in a prescribed positional relation with the first position, and wherein the second position in the living body produces a sound that is relatively weaker than a sound being produced by the first position;
controlling, by the information processing device, directivities of the plurality of microphones to increase a sensitivity with respect to the second position; and
outputting, by the information processing device, information generated based on the acquired sound signals in a state in which the directivities of the plurality of microphones are controlled to increase the sensitivity with respect to the second position to an output unit.

13. The method according to claim 12, further comprising:
storing, by the information processing device, information on the prescribed relative positional relation between the first position and the second position in a memory.

14. The method according to claim 12, further comprising:
specifying, by the information processing device, the first position based on an amplitude and a phase of the sound signal, which is generated based on a sound whose sound source is the prescribed living body site and acquired from each of the microphones, and relative positions of the plurality of microphones.

15. The method according to claim 12, further comprising:
controlling, by the information processing device, the directivities of the plurality of microphones by adjusting a delay amount of the sound signal acquired from each of the microphones and combining the adjusted delay amounts.

16. The method according to claim 12, further comprising:
determining, by the information processing device, an intensity of a sound signal acquired from the second position; and
causing, by the information processing device, the output unit to output an index generated based on the determination result.

17. The method according to claim 12, further comprising:
- controlling, by the information processing device, the directivities of at least two microphones among the plurality of microphones to increase the sensitivity with respect to the second position.

18. The method according to claim 12, further comprising:
- causing, by the information processing device, the output unit to output, when the first position is away from positions of the plurality of microphones by a prescribed distance or farther, notification information for recommending movement of the positions of the plurality of microphones.

19. The method according to claim 12, further comprising:
- measuring, by the information processing device, the relative position of each of the plurality of microphones; and
- calculating, by the information processing device, the relative positions of the plurality of microphones based on the relative position of each of the plurality of microphones measured by the relative position measurement unit.

20. The method according to claim 12, further comprising:
- calculating, by the information processing device, the relative positions of the plurality of microphones based on an image of the plurality of microphones captured by an imaging apparatus.

* * * * *